United States Patent [19]

Poppe et al.

[11] 4,055,530

[45] Oct. 25, 1977

[54] AQUEOUS DISPERSION OF ADDITION POLYMER OF AN ALPHA-BETA-ETHYLENICALLY UNSATURATED MONOMER AND SUSPENDED POLYPROPYLENE PARTICLES

[75] Inventors: Wassily Poppe, Lombard; Ivor R. Fielding, Naperville, both of Ill.

[73] Assignee: Standard Oil Company (Indiana), Chicago, Ill.

[21] Appl. No.: 553,891

[22] Filed: Feb. 27, 1975

[51] Int. Cl.² ............................................. C08L 33/10
[52] U.S. Cl. ................... 260/29.6 RW; 260/29.6 NR; 260/29.6 RB
[58] Field of Search .............. 260/29.6 RW, 29.6 RB, 260/29.6 NR, 23 AR, 23 H

[56] References Cited

U.S. PATENT DOCUMENTS

| | | | |
|---|---|---|---|
| 3,228,790 | 1/1966 | Sexsmith et al. | 260/29.6 RB |
| 3,283,036 | 11/1966 | Larson | 260/29.6 RW |
| 3,356,627 | 12/1967 | Scott | 260/29.6 RW |
| 3,367,893 | 2/1968 | Halbartschlager | 260/29.6 NR |
| 3,498,941 | 3/1970 | Hofton et al. | 260/23 H |
| 3,738,991 | 6/1973 | Reed | 260/29.6 RW |
| 3,907,737 | 9/1975 | Marx et al. | 260/29.6 RW |
| 3,926,879 | 12/1975 | Fourier et al. | 260/29.6 RW |

*Primary Examiner*—M. J. Welsh
*Attorney, Agent, or Firm*—William H. Magidson; Arthur G. Gilkes; William T. McClain

[57] ABSTRACT

Aqueous coating composition comprising a dispersion of a resinous addition polymer of an alpha, beta-ethylenically unsaturated carboxylic acid compound and suspended particles of a resinous polymer of propylene.

7 Claims, No Drawings

AQUEOUS DISPERSION OF ADDITION POLYMER OF AN ALPHA-BETA-ETHYLENICALLY UNSATURATED MONOMER AND SUSPENDED POLYPROPYLENE PARTICLES

This invention relates to aqueous coating compositions comprising a dispersion of resinous addition polymer of an alpha, beta-ethylenically unsaturated carboxylic acid compound and suspended polypropylene particles. More particularly this invention relates to aqueous coating compositions comprising a resinous addition polymer of an alpha, beta-ethylenically unsaturated carboxylic acid ester in the disperse phase, suspended polypropylene particles and suspended polycarbonamide particles.

Polypropylene has been used extensively in coatings because of its relatively low cost, inertness to many chemicals and relatively high melting point. Generally polypropylene has been deposited on substrates from organic solutions. With the advent of more and more stringent environmental protection laws there is a need for methods of depositing high molecular weight polypropylene compositions from aqueous medium. Unfortunately, high molecular weight polypropylene cannot be emulsified in the same manner as the relatively low molecular weight polyethylene used in floor polishes and other wax compositions. Further, as pointed out in our copending application Ser. No. 483,923 filed June 28, 1974 which is incorporated by reference, polyolefins, particularly stabilized polypropylene, tend to have poor adhesive strength to substrates such as glass and steel and/or poor flexibility and/or poor impact resistance, poor clarity, etc. This is unfortunate since the beverage and food industries are interested in low cost exterior coatings for glass bottles to prevent flying glass, particularly from explosion of carbonated beverage bottles, and low cost can linings. Accordingly, there is a need for aqueous crystalline polypropylene coating compositions.

The general object of this invention is to provide a new class of aqueous polypropylene coating compositions. Other objects appear hereinafter.

In the description that follows, the term "dispersion" or "dispersed" is used in a generic sense to refer to a polymer which is in emulsified form or dissolved in the aqueous media or vehicle.

We have now found that the objects of this invention can be attained with an aqueous coating composition comprising a dispersion of a resinous addition polymer of an alpha, beta-ethylenically unsaturated carboxylic acid compound and suspended particles of a resinous polymer of propylene. The dispersed resinous addition polymer acts as a suspending agent for the particulate polypropylene in the aqueous composition, acts as binder to hold the polypropylene particles on the surface of the coated substrate and after fusion of the polypropylene particles into a film or coating, it helps impart flexibility to the coating and adhesion to the substrate. Other things being equal, replacement of the resinous polymer of alpha, beta-ethylenically unsaturated acid compound with dispersed polyvinyl alcohol, polyvinyl acetate or carboxymethyl cellulose results in poor fusion on heating, possibly due to temperature sensitivity of the dispersed polymeric material or incompatibility with the polypropylene, and a rough surface coating. As explained below, it is advantageous to employ a polycarbonamide as a third polymeric material to improve the toughness, flexibility and adhesion of the coating to the substrate.

In somewhat greater detail, the resinous polymers of propylene useful in this invention have a melting point of about 150° to 175° C. and include substantially crystalline homopolymeric polypropylene, propylene-ethylene block, random or multi-segment copolymers, etc. Of these, resinous polymers of propylene containing at least 75% by weight propylene and particularly substantially crystalline homopolymeric polypropylene are preferred because they have a higher melting point and are not sticky at slightly elevated temperatures. These polymers should have an average particle size of 500 microns diameter or less, preferably 250 microns or less, in order to coalesce properly on heat fusion of the coatings.

The resinous addition polymers of alpha, beta-ethylenically unsaturated carboxylic acid compounds can be homopolymers, copolymers of two or more alpha, beta-ethylenically unsaturated carboxylic acid compounds or copolymers of one or more alpha, beta-ethylenically unsaturated carboxylic acid compounds and one or more other copolymerizable ethylenically unsaturated monomers. Suitable alpha, beta-ethylenically unsaturated carboxylic acid compounds include alpha, beta-ethylenically unsaturated monocarboxylic acids such as acrylic acid, methacrylic acid, ethacrylic acid, crotonic acid, etc; alpha, beta-ethylenically unsaturated dicarboxylic acids such as fumaric acid, maleic acid, maleic anhydride, itaconic acid, etc.; alkyl esters of alpha, beta ethylenically unsaturated mono and dicarboxylic acids containing from 1 to 18 carbon atoms in the alkyl groups such as methyl acrylate, methyl methacrylate, dimethyl itaconate, dimethyl fumarate, dimethyl maleate, monomethyl itaconate, ethyl acrylate, ethyl methacrylate, monoisopropyl maleate, 2-ethylhexyl acrylate, tert-butyl acrylate, cyclohexyl acrylate, lauryl methacrylate, stearyl acrylate, stearyl methacrylate, hydroxyethyl methacrylate, 2-hydroxypropyl acrylate, 2,3-dihydroxypropyl methacrylate, N,N-diethylaminoethyl methacrylate, N-tert-butylaminoethyl acrylate, sulfoethyl methacrylate, etc. Suitable other comonomers include monovinyl aromatics such as styrene, vinyl toluene, alpha-methylstyrene; alpha, beta-ethylenically unsaturated nitriles such as acrylonitrile and methacrylonitrile; vinyl esters of saturated acids containing 2 to 18 carbon atoms such as vinyl acetate, vinyl propionate and vinyl stearate; alpha, beta-ethylenically unsaturated amides such as acrylamide and methacrylamide; vinyl alkyl ethers such as vinyl methyl ether, vinyl ethyl ether and vinyl butyl ether; vinylidene halides, such as vinyl chloride, vinylidene chloride, vinyl flouride and vinyl bromide, etc, ethylene, etc. These polymers can be water-soluble or in emulsion form under the conditions of use. For the most part, the water-solubility of these polymers like other polymers is dependent upon the concentration of hydrophilic groups (e.g. free carboxylic acid groups, hydroxyalkyl groups, aminoalkyl groups, etc.) in the polymers, the pH of the aqueous composition and polymer molecular weight.

The preferred addition polymers contain one or more free acid groups, preferably provided by acrylic acid and/or methacrylic acid, in a concentration of 0.5 to 50% by weight, preferably 5 to 25 percent by weight, and at least some "soft" alkyl ester of an alpha beta-ethylenically unsaturated acid or ethylene as the principle comonomer in concentrations of 25 to 99.5 percent by weight of the polymer. Correspondingly from 0 to 74.5 weight percent of the polymer can be composed of other comonomers including the so-called "hard" alkyl esters of alpha, beta-ethylenically unsaturated carboxylic acid esters. The terms "hard" and "soft" are used in the manner described in Riddle, Acrylic Esters, Reinhold Publishing Co. 1954, pp 58 et seq; U.S. Pats. Nos. 2,795,564 and 3,457,208, all of which are incorporated by reference. Generally, this refers to the "brittle-point" of the polymer, i.e. the temperature at which the polymer breaks on flexing. The "soft" monomers have brittle points below 20° C. and give rise to latex polymers which are film-forming at room temperature. Polymers containing soft monomers or ethylene advantageously plasticize the polypropylene coating and improve the flexibility of the coating. On the other hand polymers containing the aforesaid free acid groups impart to coatings improved adhesion to metal substrates. The free acid groups are also advantageous in providing reactive groups for cross-linking the coating.

Suitable "soft" monomers include primary or secondary alkyl esters of acrylic acid containing up to eight carbon atoms in the alkyl group and primary or secondary alkyl esters of methacrylic acid containing from 4 to 12 carbon atoms in the alkyl group. Representative soft monomers are methyl acrylate, ethyl acrylate, isopropyl acrylate, butyl acrylate, amyl acrylate, hexyl acrylate, heptyl acrylate, 2-ethylhexyl acrylate, butyl methacrylate, amyl methacrylate, dodecyl methacrylate, etc.

The dispersed resinous addition polymers of alpha, beta-ethylenically unsaturated carboxylic acid compounds can be used in a concentration of from 5 to 200 parts by weight dry solids basis, preferably 30 to 120 parts by weight, per each 100 parts by weight polypropylene. In general, the lower the concentration of dispersed resinous polymer the more desirable the presence of polycarbonamide for imparting flexibility and adhesion to the coating.

Polycarbonamides useful in this invention can be in the emulsified form, such as those described in U.S. Pat. No. 3,844,991 to Ferraro et al. which is incorporated by reference, or in the particulate form of up to 500 microns diameter, preferably less than 250 microns diameter. These polymers, as is well known, can be produced by the polymerization of ω-aminoacids, such as 6-aminocaproic acid, 11-aminoundecanoic acid, 12-aminododecanoic acid, etc. or their corresponding lactams, such as caprolactam (nylon 6); and salts of diamines with dicarboxylic acids, such as hexamethylene diamine with adipic acid (nylon 6-6), etc.

Preferably, the polycarbonamides useful in this invention are condensation products of long chain fatty dicarboxylic acids (or acid derivatives) having at least 18 carbon atoms up to about 72 carbon atoms and polyamines having two primary amino groups. The long chain of the dicarboxylic acid moiety of the polycarbonamide gives the polycarbonamide a sufficient hydrocarbon or fatty property that these polymers are compatible with polyolefins over a broad range of proportions as opposed to the polycarbonamides such as nylon 6 or 6-6. Suitable long chain dicarboxylic acids include alpha, omega-dicarboxyhexadecane, alpha, omega-dicarboxytetracosane, the so-called dimer acids, etc. Suitable polyamines containing at least two primary amino groups include hexamethylene diamine, octamethylene diamine, decamethylene diamine, diethylene triamine, etc. Of these, Crystalclad-EP-2100, a dimer acid/hexamethylene diamine polyamide recommended for coating pop bottles, is particularly preferred because it is available in small particle form and does not have to be cryogenically milled to obtain an optimum particle size under 250 microns.

The polycarbonamides can be used in a concentration of from 0 to 50 parts by weight dry solids basis, preferably 10 to 35 parts by weight, per each 100 parts by weight resinous polymer of propylene. Other things being equal the higher the concentration of polycarbonamide the better the flexibility, toughness and adhesion of the coating.

The composition may be pigmented if clear coatings are not desired. For this purpose there may be incorporated into the composition an amount of pigment, extender, filler, delustrant, or the like, such that the weight ratio of the polymer solids to pigment is 20 to 1 to 1 to 20 depending upon the particular effect desired. Suitable pigments include titanium dioxide, ultramarine blue, zinc oxide, zinc sulfite, barium sulfate, calcium carbonate, zinc chromate, carbon black, etc. Of these zinc oxide is particularly preferred since it can be used to cross-link dispersed polymers containing free carboxyl groups.

The polymeric components of the aqueous coating composition can comprise from 10 to 75 parts by weight per each 100 parts by weight of the aqueous composition. Generally the polymeric solids concentration will be from about 20 to 75 parts by weight per each 100 parts by weight of the aqueous composition when unpigmented compositions are utilized and from 10 to 60 parts by weight per 100 parts by weight of the aqueous composition in pigmented compositions.

The composition of this invention can be acidic or alkaline. When alkaline systems are employed, volatile compounds, such as ammonia or morpholine are preferred for establishing the desired pH. Generally, the preferred dispersed polymers of this invention contain in excess of 5% by weight acid polymer units and are soluble at pH of 8 or more.

The coatings may be applied to all sorts of surfaces for a wide variety of purposes, such as to metals, iron, steel, copper, brass, aluminum, chromium, nickel and the like; to glass, porcelain, other ceramic materials; to articles made of plastic materials such as polyesters, polymers of alkyl acrylates and methacrylate, such as methyl methacrylate or copolymers thereof; wood, textile fabrics, leather, paper, cardboard, etc.

As indicated above, the compositions of this invention are particularly well suited for coating glass containers and metal can blanks. For example, the compositions can be applied to metal can blanks (steel, aluminum, tin plated steel, etc) prior to fabrication into containers or applied to the exterior of glass containers.

The aqueous coating compositions can be applied by any conventional technique, such as brushing, dipping, spraying, etc. The coated substrate is heated to drive off water during which time the dispersed polymer usually coalesces and binds the higher melting resinous polymer of propylene and any polycarbonamide and/or pigment to the substrate. After removal of water or simultaneously with removal of water the coated substrates are maintained at 190° to 230° C. until the resinous polymer of propylene and any polycarbonamide coalesces. Below bout 190° C. the coating tends to orange peel while above 230° C the polypropylene decomposes and the coating yellows. When the composition is pigmented, temperatures up to about 250° C. can be tolerated.

Various other cross-linking agents for the free carboxyl, amino or hydroxyl groups of the dispersed polymer can be added to the coating compositions of this invention to improve the water-resistance of the applied coatings and eliminate tackiness of the coating due to heating for a longer period than necessary. Suitable cross-linking agents include metal salts such as zinc ammonium carbonate, zinc acetate, zirconium acetate, etc.; aminoplasts such as melamine formaldehyde and urea formaldehyde reaction products, etc; polyazirdinyl compounds such as MAPS or MAPO, etc.

The following examples are merely illustrative and should not be construed as limiting the scope of the invention.

The tests referred to in the examples were carried out as follows:

To measure adhesion on a metal surface an "X" or a cross-hatch network was scribed in the cured coating. No. 610 Scotch Tape was placed over the scribed area and smoothed until intimate, uniform contact was made with the coating. The tape was pulled off with a rapid, vertical motion. The tape and metal substrate were examined for coating removal. Adhesion was the percent of the film which was not removed from the metal surface.

Flexibility of the coating was determined using a conical mandrel. The coated metal panel was bent through about a 180° arc in about 15 seconds on a conical mandrel. The coating was examined for cracks and loss of adhesion. The distance of cracking along the bend was measured with the results being percent elongation. The maximum % elongation measurable by this test is 31.5%. Possible cracks, as evidenced by whitening of the coating were considered as a sign of insufficient flexibility.

The water pasteurization test was carried out by immersing the coated panel for 30 minutes in water at 155° F. followed by scribing an "X" for the adhesion test.

EXAMPLE I

Two hundred grams of unstabilized homopolymeric crystalline polypropylene having an average molecular weight of 380,000 sieved through a 60 mesh screen (U.S. Standard Sieve Series, 250 micron opening),was stabilized by addition to 0.2 grams of butylated-hydroxytoluene, dissolved in 600 grams chloroform. The composition was stirred, chloroform allowed to evaporate off in a hood, and the dry polymer composition placed in a vacuum oven at 60° C. overnight to remove all traces of chloroform and ball-milled overnight.

Thirteen and one-half grams of solid acrylic copolymer composed of 51 weight percent methyl acrylate, 33 weight percent ethyl acrylate and 16 weight percent acrylic acid having an average molecular weight of 70,000 and a Tg of 21° C. was dissolved in an aqueous composition composed of 74.9 grams water and 1.6 grams concentrated (28%) ammonium hydroxide at 120° F. with stirring.

Thirty-five parts by weight of the stabilized crystalline polypropylene described above, 3.8 parts by weight of the aqueous acrylic solution (dry basis) described in the preceding paragraph, 0.5 parts by weight concentrated ammonium hydroxide and 60.8 parts by weight water were blended in a Waring blendor and run through a Morehouse colloid mill. The aqueous composition was sprayed on a QAR steel panel, baked 2 minutes at 200° C., air cooled and aged overnight prior to testing. The 1 mil thick coating had 100% cross-hatch and scribed "x"adhesion before water pasteurization and 12.7% elongation by the Mandrel test. After water pasteurization the adhesion decreased to 50%.

EXAMPLE II

The adhesion to metal and flexibility were both improved by increasing the proportion of acrylic resin to polypropylene. Example I was repeated using a coating composition comprising 25 parts by weight of the stabilized crystalline polypropylene, 6.0 parts by weight acrylic resin (dry weight), 0.7 parts by weight concentrated ammonium hydroxide and 68.3 parts by weight water. The 1 mil coating had 100% cross-hatch and scribed "X" adhesion before water pasteurization, 90% adhesion after water pasteurization and 31.5% elongation.

EXAMPLE III

Example II was repeated except that 5 parts by weight water was replaced with 5 parts by weight polyamide of a dimer acid-hexamethylene diamine copolymer (Crystalclad-EP-2100) having a particle size distribution of 20% by weight under 10 microns diameter. 50% by weight between 10 to 40 microns and 30% by weight between 40 to 100 microns diameter. The same physical testing results were obtained as in Example II except that the coating was tougher and more abrasion resistant.

EXAMPLE IV

This example illustrates the use of a dispersed acrylic copolymer in the emulsion. Ten parts wet weight of a 40% solid aqueous pH 6 emulsion of a copolymer composed of 51 weight percent methyl acrylate, 33 weight percent ethyl acrylate and 16 weight percent acrylic acid, 10 parts by weight stabilized polypropylene used in Example I and 20 parts by weight additional water were mixed, painted on a QAR steel panel, baked three minutes at 200° C., air cooled and tested. The coating had 100% adhesion before pasteurization and 99% adhesion after pasteurization.

EXAMPLE V

This example illustrates the use of a clear coating composition containing two cross-linking for the dispersed polymer. A coating composition having pH 8.5 was formulated by first dissolving 19 parts wet weight of the 40% solids emulsion copolymer used in Example IV in 7.1 parts concentrated ammonium hydroxide and 47.4 parts by weight water. Nineteen parts by weight stabilized polypropylene used in Example I, .5 parts by weight zinc oxide, 4.7 parts by weight Crystalclad EP-2100, 1.5 parts by weight water-soluble melamine-formaldehyde condensate and .8 parts by weight Nopcoflo-100 (amidotype flow agent) were added to the acrylic solution. The composition was sprayed on CCO steel and baked 3 minutes at 200° C. and air cooled. The coating had 100% cross-hatch and scribed "X" adhesion before pasteurization, 100% adhesion after pasteurization and 31.5% elongation by the Mandrel test.

EXAMPLE VI

Example V was repeated with essentially the same physical results except that approximately 10.5 parts by weight titanium dioxide pigment was added to the coating composition and TP steel panel was used.

EXAMPLE VII

This example illustrates the use of an ethylene-acrylic acid copolymer as the dispersed polymer. After 5 grams Union Carbide EAA 9500 (18-20% by weight acrylic acid/80-82% by weight ethylene copolymer) was dissolved in 25 grams water containing 1 gram concentrated ammonium hydroxide and 1 drop octylphenoxy polyoxyethylene glycal having 30 units, 5 grams of the stabilized polypropylene of Example I was added and the composition was sprayed on QAR steel and cured at 200° C. for 4 minutes. The coating had 100% adhesion and excellent flexibility when the panel was bent approximately 180°.

We claim:

1. An aqueous coating composition comprising a dispersion of a resinous addition polymer comprising from about 0.5 to 50% by weight of an alpha, beta-ethylenically unsaturated carboxylic acid and from 25 to 99.5% by weight of at least one monomer selected from the group consisting of ethylene and soft alkyl ester of an alpha, beta-ethylenically unsaturated carboxylic acid and suspended particles of a resinous polymer of propylene containing at least 75% by weight propylene wherein said resinous polymer of propylene has a melting point of about 150° to 175° C. and an average particle size of 500 microns diameter or less.

2. The composition of claim 1, wherein said resinous addition polymer of an alpha, beta-ethylenically unsaturated carboxylic acid compound comprises from 5 to 200 parts by weight per each 100 parts by weight resinous polymer of propylene.

3. The composition of claim 2, wherein said polymeric components of said coating composition comprise from 10 to 75 parts by weight per each 100 parts by weight of the coating composition.

4. The composition of claim 1, wherein said alpha, beta-ethylenically unsaturated carboxylic acid comprises at least 5 weight percent of at least one acid selected from the group consisting of acrylic acid and methacrylic acid.

5. The composition of claim 1 wherein said resinous polymer of an alpha, beta-ethylenically unsaturated carboxylic acid compound comprises from 25 to 99.5 weight percent soft alkyl ester of an alpha, beta-ethylenically unsaturated carboxylic acid.

6. The composition of claim 1 wherein said resinous polymer of an alpha, beta-ethylenically unsaturated carboxylic acid compound comprises from 25 to 99.5 weight percent ethylene.

7. The composition of claim 1 wherein said composition comprises a polycarbonamide.

* * * * *